US007901661B2

(12) United States Patent
Lueking et al.

(10) Patent No.: US 7,901,661 B2
(45) Date of Patent: Mar. 8, 2011

(54) SYNTHESIS OF HYDROGEN-CARBON CLATHRATE MATERIAL AND HYDROGEN EVOLUTION THEREFROM AT MODERATE TEMPERATURES AND PRESSURES

(75) Inventors: Angela Lueking, State College, PA (US); Deepa Narayanan, Redmond, WA (US)

(73) Assignee: The Penn State Research Foundation, University Park, PA (US)

( * ) Notice: Subject to any disclaimer, the term of this patent is extended or adjusted under 35 U.S.C. 154(b) by 1110 days.

(21) Appl. No.: 11/613,999

(22) Filed: Dec. 20, 2006

(65) Prior Publication Data

US 2007/0144063 A1    Jun. 28, 2007

Related U.S. Application Data

(60) Provisional application No. 60/752,507, filed on Dec. 21, 2005, provisional application No. 60/752,506, filed on Dec. 21, 2005.

(51) Int. Cl.
*C01B 3/02* (2006.01)
*C01B 3/04* (2006.01)
*C01B 3/22* (2006.01)
*C01B 3/24* (2006.01)
*C01B 3/26* (2006.01)
*C01B 31/00* (2006.01)
*C01B 31/06* (2006.01)

(52) U.S. Cl. ............... 423/648.1; 423/439; 423/446; 423/650; 423/651; 423/658.2

(58) Field of Classification Search .......... 423/644, 423/645, 646, 647, 658.2, 445 R, 446, 460, 423/648.1, 650, 651, 439
See application file for complete search history.

(56) References Cited

U.S. PATENT DOCUMENTS

| | | | | |
|---|---|---|---|---|
| 4,292,164 | A * | 9/1981 | Derbyshire et al. | 208/418 |
| 6,080,381 | A * | 6/2000 | Zaluska et al. | 423/648.1 |
| 6,514,478 | B2 * | 2/2003 | Zaluska et al. | 423/644 |
| 6,572,836 | B1 * | 6/2003 | Schulz et al. | 423/648.1 |
| 6,596,055 | B2 | 7/2003 | Cooper et al. | |
| 6,626,981 | B2 | 9/2003 | Wojtowicz et al. | |

(Continued)

FOREIGN PATENT DOCUMENTS

JP    2005-52722    *   3/2005

OTHER PUBLICATIONS

Ichikawa, T., D.M. Chen, S. Isobe, E. Gomibuchi, and H. Fujii. "Hydrogen storage properties on mechanically milled graphite." Materials Science and Engineering B, vol. 108, p. 138-142 (2004).

(Continued)

*Primary Examiner* — Wayne Langel
(74) *Attorney, Agent, or Firm* — Gifford, Krass, Sprinkle, Anderson & Citkowski, P.C.

(57) ABSTRACT

A process for making a hydrogenated carbon material is provided which includes forming a mixture of a carbon source, particularly a carbonaceous material, and a hydrogen source. The mixture is reacted under reaction conditions such that hydrogen is generated and/or released from the hydrogen source, an amorphous diamond-like carbon is formed, and at least a portion of the generated and/or released hydrogen associates with the amorphous diamond-like carbon, thereby forming a hydrogenated carbon material. A hydrogenated carbon material including a hydrogen carbon clathrate is characterized by evolution of molecular hydrogen at room temperature at atmospheric pressure in particular embodiments of methods and compositions according to the present invention.

29 Claims, 6 Drawing Sheets

U.S. PATENT DOCUMENTS

| | | | |
|---|---|---|---|
| 6,680,042 | B1* | 1/2004 | Schulz et al. ............... 423/644 |
| 6,733,725 | B2* | 5/2004 | Zaluska et al. ............... 420/528 |
| 2004/0230084 | A1 | 11/2004 | Yagi |
| 2005/0002857 | A1 | 1/2005 | Pez et al. |
| 2007/0148080 | A1 | 6/2007 | Lueking et al. |

OTHER PUBLICATIONS

Orimo, S., T. Matsushima, H. Fujii, T. Fukunaga, and G. Majer. "Hydrogen desorption property of mechanically prepared nanostructured graphite." Journal of Applied Physics, vol. 90, No. 3, p. 1545-1549 (2001).

Bobet, J.L., E. Grigorova, M. Khrussanova, M. Khristov, P. Stefanov, P. Peshev, D. Radev. "Hydrogen sorption properties of graphite-modified magnesium nanocomposites prepared by ball-milling." Journal of Alloys and Compounds, vol. 366, No. 1-2, p. 298-302 (2004).

Hirscher, M., M. Becher, M. Haluska, A. Ouintel, V. Shakalova, Y.M. Choi, U. Dettlaff-Weglikowska, S. Roth, I. Stepanek, P. Bernier, A. Leonhardt, J. Fink. "Hydrogen storage in carbon nanostructures." Journal of Alloys and Compounds, vol. 330-332, p. 654-658 (2002).

Bouaricha, S., J.P. Dodelet, D. Guay, J. Huot, S. Boily, R. Schulz. "Effect of carbon-containing compounds on the hydriding behavior of nanocrystalline $Mg_2Ni$." Journal of Alloys and Compounds, vol. 307, No. 1-2, p. 226-233 (2000).

Imamura, H., S. Tabata, Y. Takesue, Y. Sakata, S. Kamazaki. "Hydriding-dehydriding behavior of magnesium composites obtained by mechanical grinding with graphite carbon." International Journal of Hydrogen Energy, vol. 25, No. 9, p. 837-843 (2000).

Janot, R., L. Aymard, A. Rougier, G.A. Nazri, J.M. Tarascon. "Enhanced hydrogen sorption capacities and kinetics of $Mg_2Ni$ alloys by ball-milling with carbon and Pd coating." Journal of Materials Research, vol. 18, No. 8, p. 1749-1752 (2003).

Bouaricha, S., J.P. Dodelet, D. Guay, J. Huot, and R. Schulz. "Study of the activation process of Mg-based hydrogen storage materials modified by graphite and other carbonaceous compounds." Journal of Materials Research, vol. 16, No. 10, p. 2893-2905 (2001).

Imamura, H., Y. Usui, and M. Takashima. "Preparation and hydriding properties of magnesium-containing hydrogen storage materials chemically deposited from a homogeneous phase." Journal of the Less-Common Metals, vol. 175, No. 1, p. 171-176 (1991).

Wu, F., J. Zhu, K. Ibe, and T. Oikawa. "Analysis of the Interface in Graphite/Magnesium Composites at the Nanometer Scale." Composites Science and Technology, vol. 58, No. 1, 77-82 (1998).

Dal Toe, S., S. Lo Russo, A. Maddalena, G. Principi, A. Saber, S. Sartori, T. Spataru. "Hydrogen desorption from magnesium hydride-graphite nanocomposites produced by ball milling." Materials Science and Engineering B, vol. 108, No. 1-2, p. 24-27 (2004).

Imamura, H. and M. Nakamura. "Hydriding Properties of Mg-Based Hydrogen Storage Materials Prepared Chemically from a Homogenous Phase." Zeitschrift fur Physikalische Chemie, vol. 183, p. 157-162 (1994).

Imamura, H., Y. Takesue, S. Tabata, N. Shigetomi, Y. Sakata, and S. Tsuchiya. "Hydrogen storage composites obtained by mechanical grinding of magnesium with graphite carbon." Chemical Communications, p. 2277-2278 (1999).

Hirscher, M., M. Becher, M. Haluska, F. von Zeppelin, X. Chen, U. Dettlaff-Weglikowska, S. Roth. "Are carbon nanostructures an efficient hydrogen storage medium?" Journal of Alloys and Compounds, vol. 356-357, p. 433-437 (2003).

Orimo, S., G. Majer, T. Fukunaga, A. Zuttel, L. Schlapbach, and H. Fujii. "Hydrogen in the mechanically prepared nanostructured graphite." Applied Physics Letters. vol. 75, No. 20. p. 3093-3095 (1999).

Fukunaga, T., K. Itoh, S. Orimo, K. Aoki. "Structural observation of nano-structured and amorphous hydrogen storage materials by neutron diffraction." Materials Science and Engineering B, vol. 108, pp. 105-113 (2004).

Imamura, H., S. Tabata, N. Shigetomi, Y. Takesue, Y. Sakata. "Composites for hydrogen storage by mechanical grinding of graphite carbon and megnesium." Journal of Alloys and Compounds, vol. 330-332, p. 579-583 (2002).

Smolira, A., M. Szymanska, E. Jartych, A. Calka, L. Michalak. "Structural transformations in graphite induced by magneto-mechanical-milling in hydrogen atmosphere." Journal of Alloys and Compounds, vol. 402, p. 256-262 (2005).

Imamura, H., N. Sakasai, and T. Fujinaga. "Characterization and hydriding properties of Mg-graphite composites prepared by mechanical grinding as new hydrogen storage materials." Journal of Alloys and Compounds, vol. 253-254, p. 34-37 (1997).

Imamura, H., N. Sakasai, Y. Kajii. "Hydrogen absorption of Mg-Based composites prepared by mechanical milling: Factors affecting its characteristics." Journal of Alloys and Compounds, vol. 232, p. 218-223 (1996).

Iwakura, C., H. Inoue, N. Furukawa, and S. Nohara. "Research and Development of Mg-Based Hydrogen Storage Alloys for Intended Use in Nickel Metal Hydride Batteries." Electrochemistry, vol. 71, No. 9, p. 776-782 (2003).

* cited by examiner

SYNTHESIS OF HYDROGEN-CARBON CLATHRATE MATERIAL AND HYDROGEN EVOLUTION THEREFROM AT MODERATE TEMPERATURES AND PRESSURES

REFERENCE TO RELATED APPLICATIONS

This application claims priority of U.S. Provisional Patent Application Ser. Nos. 60/752,506, filed Dec. 21, 2005, and 60/752,507, filed Dec. 21, 2005, both of which are incorporated herein by reference in their entirety.

GOVERNMENT SPONSORSHIP

This invention was made with government support under Grant No. DE-FC26-03NT41874, awarded by the Department of Energy. The Government has certain rights in the invention.

FIELD OF THE INVENTION

The present invention relates generally to methods of hydrogen generation, synthesis of hydrogen storage materials and reversible hydrogen storage. In particular, the present invention relates to combined hydrogen generation and reversible hydrogen storage at moderate temperatures and pressures.

BACKGROUND OF THE INVENTION

Current methods of energy production have significant drawbacks, including generation of pollution which has a significant impact on the environment. Hydrogen is a promising source of clean energy and there have been numerous recent efforts to develop technologies for generating and storing hydrogen.

Town gas, the product of crude forms of coal gasification, provided fuel to light city streets prior to the development of natural gas transmission and centralized electricity. With the advent of the Hydrogen Fuel Initiative, modern coal gasification is one route for centralized hydrogen production that builds from existing coal-fired power plant infrastructure. Modern coal-fired power plants rely on burning coal in air; changing the reaction temperature and introducing water shifts the chemical reaction to produce up to 40% hydrogen. Coal gasification is one of the most economical routes to hydrogen production, and is more energy efficient than current methods that utilize the vast coal resources in the United States to make electricity. Cost estimates for hydrogen production from coal are based on "to the gate" delivery, as hydrogen storage is the subject of extensive research and development. Solid-state hydrogen storage materials under investigation include metal hydrides, chemical hydrides, and nanoporous high-surface area materials. Solid state storage goals—including gravimetric and volumetric capacity, operating temperature and pressure, and recharge and discharge rates—directly tie to the thermodynamics and kinetics of the interaction between hydrogen and the candidate material. The challenge is to obtain the desired capacities in the target temperature range while maintaining reversible hydrogen uptake and discharge. Meeting one target often compromises another: for example, polyethylene $(CH_2)_n$ contains 14.3% by weight hydrogen, but hydrogen is not released in the target temperature region between −40° C. and 85° C. due to the large C—H bond strength.

Thus, there is a continuing need for methods and compositions for hydrogen generation, reversible hydrogen storage and hydrogen delivery from storage materials. Particularly desired are methods and compositions for combined hydrogen generation and reversible hydrogen storage achieved at moderate temperatures and pressures.

SUMMARY OF THE INVENTION

A process for making a hydrogenated carbon material is provided which includes forming a mixture of a carbon source, particularly a carbonaceous material, and a hydrogen source. The mixture is reacted under reaction conditions such that hydrogen is generated and/or released from the hydrogen source, an amorphous diamond-like carbon is formed, and at least a portion of the generated and/or released hydrogen associates with the amorphous diamond-like carbon, thereby forming a hydrogenated carbon material.

In certain embodiments, reaction conditions include a system pressure in the range of 0.1-50 atm. In preferred embodiments, reaction conditions include a system pressure in the range of 0.9-10 atm. In addition, reaction conditions may include a system temperature in the range of 0-100° C. in particular embodiments. In preferred embodiments, the reaction conditions include a system temperature in the range of 10-40° C.

In such a process according to the present invention producing the hydrogenated carbon material includes contacting a crystalline and/or diamond-like carbon material, produced by addition of energy to a carbon source, with a hydrogen source.

Further, in preferred embodiments, producing the hydrogenated carbon material includes adding kinetic energy to a mixture of a carbon source and a hydrogen source.

Optionally, a carbon source is a carbonaceous material including at least 30% carbon by weight. A preferred carbonaceous material includes an amorphous carbon material and/or a crystalline carbon material. A preferred carbonaceous material is a coal such as an anthracite, lignite, bituminous, sub-bituminous or a combination thereof. In certain embodiments, the carbonaceous material is a graphite. An included hydrogen source is optionally a hydrocarbon, an inorganic hydrogen-containing material and/or hydrogen gas. An exemplary inorganic hydrogen-containing material is a metal hydride.

A combined hydrogen production and reversible hydrogen storage process, is provided according to embodiments of the present invention which includes adding energy to a mixture of a carbon source and a hydrogen source under moderate temperature and moderate pressure reaction conditions, such that hydrogen is generated and/or released from the hydrogen source, an amorphous diamond-like carbon is formed, and at least a portion of the hydrogen generated and/or released is associated with amorphous diamond-like carbon, forming a hydrogenated carbon material including a hydrogen carbon clathrate, and thereby producing hydrogen and storing hydrogen as stored hydrogen.

In preferred embodiments, energy is added by a high kinetic energy process. An exemplary preferred high kinetic energy process is ball milling. Energy is optionally added by heating and/or by increasing pressure.

In one option, the mixture further includes a transition metal. A transition metal is optionally present in an amount in the range of 0.001-40% by weight of the carbon source. In further embodiments, a transition metal is optionally present in an amount in the range of 0.005-1% by weight of the carbon source. In yet further embodiments, a transition metal is present in an amount in the range of 0.01-0.1% by weight of the carbon source.

In certain embodiments, the carbon source further comprises a second material in addition to carbon selected from a transition metal, an alkaline earth metal, an alkali metal, a non-metal and combinations of these.

In preferred embodiments, a carbon source includes an unsaturated hydrocarbon. In further preferred embodiments, the carbon source includes an acene.

A provided process according to the present invention includes preferred embodiments in which the carbon source is a coal. A hydrogen source is endogenous and/or exogenous to the coal.

Embodiments of inventive methods further include evolving at least a portion of the stored hydrogen under hydrogen evolution conditions to produced evolved molecular hydrogen. In the context of hydrogen evolution, hydrogen evolutions conditions are optionally in the range of about 10° C.-about 400° C. Hydrogen evolution conditions include moderate temperature conditions in particular embodiments. Optionally, hydrogen evolution conditions include temperature conditions higher than room temperature.

An inventive method further includes collecting the evolved molecular hydrogen in particular embodiments. For example, evolved molecular hydrogen is optionally collected in a container, transport vehicle, or conduit. Further embodiments include transporting the evolved molecular hydrogen to a desired location.

A combined hydrogen production and reversible hydrogen storage process is provided which includes adding kinetic energy to a mixture of coal and a hydrogen source under moderate temperature and moderate pressure reaction conditions. Hydrogen is generated and/or released from the hydrogen source and an amorphous diamond-like carbon is formed thereby and at least a portion of the hydrogen generated and/or released associates with the amorphous diamond-like carbon, forming a hydrogenated carbon material including a hydrogen carbon clathrate. Thus hydrogen is produced from the hydrogen source and hydrogen is stored in the hydrogenated carbon material.

In particular embodiment, the hydrogen source is a hydrocarbon exogenous to the coal. For example, a preferred hydrocarbon is an unsaturated hydrocarbon. Suitable unsaturated hydrocarbons are exemplified by olefins, such as cyclohexene.

A moderate temperature for reaction conditions in a reaction system is in the range of about 0-100° C., inclusive and a moderate pressure is in the range of about 0-10 atm, inclusive. In further embodiments, a moderate temperature for reaction conditions in a reaction system is in the range of about 10-40° C., inclusive. In particular embodiments, no heat is added to a reaction system, such as a reactor and reactants. It is appreciated that addition of kinetic energy to a reaction system may increase the temperature of the reaction system due to friction, for instance. Thus, the reaction system temperature in a system run with no added heat may be elevated above room temperature due to such friction and/or other operational and/or reaction sources. However, friction and/or other operational and/or reaction sources do not result in reaction conditions appreciably over 100° C.

In preferred embodiments, a hydrogenated carbon material including a hydrogen carbon clathrate is characterized by evolution of molecular hydrogen at room temperature and atmospheric pressure. In particularly preferred embodiments, the produced hydrogenated carbon material includes produced molecular hydrogen. In additional embodiments, the hydrogenated carbon material also includes produced hydrogen bound to carbon.

A process of producing hydrogen from a hydrogen source is provided according to the present invention which includes contacting an amorphous diamond-like carbon dehydrogenation catalyst and a hydrogen source under dehydrogenation reaction conditions, thereby generating and/or releasing hydrogen from the hydrogen source and producing hydrogen. In preferred embodiments, the hydrogen source is a hydrocarbon. In further preferred embodiments, the hydrogen source is an inorganic hydrogen-containing material.

A composition according to the present invention is provided which includes a hydrogenated carbon material including a hydrogen-carbon clathrate. An inventive hydrogenated carbon material including a hydrogen carbon clathrate is characterized by evolution of molecular hydrogen at room temperature at atmospheric pressure in preferred embodiments.

A dehydrogenation material is provided according to embodiments of the present invention. A provided dehydrogenation material is produced in embodiments including adding energy, particularly kinetic energy to a carbon source, and optionally, a hydrogen source, producing a dehydrogenation material effective to dehydrogenate a hydrogenated material. In preferred embodiments, a transition metal is present in a mixture to which energy is added to produce a dehydrogenation material. For example, high kinetic energy milling of a coal, such as an anthracite coal produces a dehydrogenation material active to dehydrogenate a hydrogenated material. In a further example, high kinetic energy milling of a coal, such as an anthracite coal in a mixture including a hydrogen source, such as cyclohexene, produces a dehydrogenation material active to dehydrogenate a hydrogenated material. A transition metal present in the mixture may be added to the mixture, be extracted from a reaction vessel, such as a ball mill, and/or be present in a carbon source and/or hydrogen source. A dehydrogenation material is a dehydrogenation catalyst in a particular embodiment.

In particular embodiments, a dehydrogenation material includes a carbon-based product including a crystalline carbon and/or a diamond-like carbon. In further preferred embodiments a dehydrogenation material includes a metal, particularly a transition metal. Thus, in a particular example, a tetrahedral diamond-like carbon produced by addition of energy to a carbon source, preferably in the presence of a metal, is a dehydrogenation material according to embodiments of the present invention.

A process for generating hydrogen is provided by embodiments of the present invention which includes providing an amorphous diamond-like carbon and forming a mixture including the amorphous diamond-like carbon and a hydrogen source. The mixture is incubated under reaction conditions sufficient to generate and/or release hydrogen from the hydrogen source, thereby generating molecular hydrogen. In particular embodiments, the mixture further includes a transition metal. Preferred reaction conditions include moderate temperature and pressure conditions.

DETAILED DESCRIPTION OF THE PREFERRED EMBODIMENTS

Processes and compositions according to the present invention are provided for generating hydrogen, storing hydrogen in a carbon-based storage material and/or evolving hydrogen from the storage material for use in a variety of applications such as powering a vehicle or portable device for example.

Figure 1A:
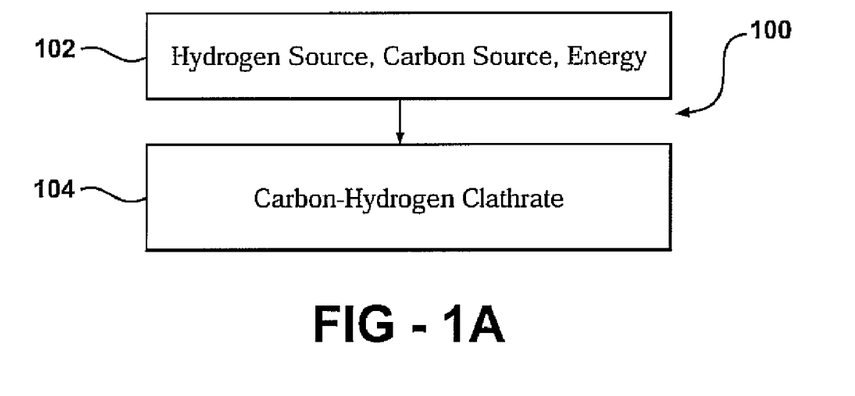
FIG. 1A is a block diagram illustrating a combined hydrogen production-storage process according to the present invention.

FIG. 1A illustrates a combined hydrogen production and hydrogen storage process 100 provided according to an embodiment of the present invention including adding energy to a mixture of a carbon source and a hydrogen source and reacting the mixture 102, producing a hydrogenated carbon material including a hydrogen-carbon clathrate 104.

Figure 1B:
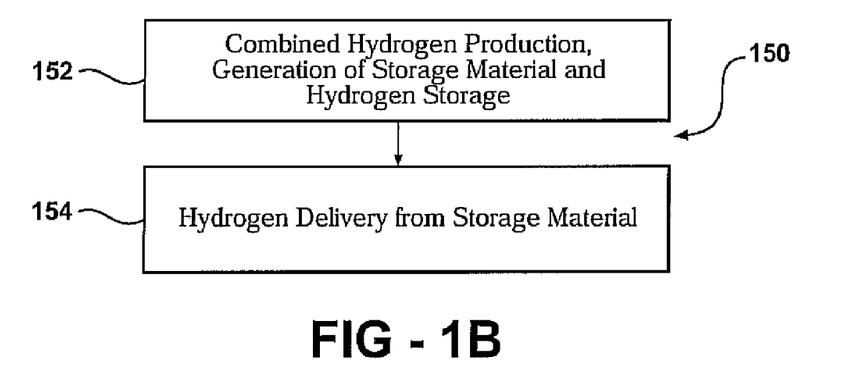
FIG. 1B is a block diagram illustrating a method of synthesis of hydrogen-carbon clathrate material and hydrogen evolution therefrom at moderate temperatures and pressures.

FIG. 1B illustrates a process 150 according to an embodiment of the present invention including combined hydrogen production and storage 152 along with evolution of hydrogen from a generated hydrogen storage material 154.

A combined moderate-temperature and moderate-pressure hydrogen production and hydrogen storage process is provided including adding energy to a mixture of a carbon source and a hydrogen source and reacting the mixture under reaction conditions including moderate-temperature and moderate-pressure, producing a hydrogenated carbon material including a hydrogen-carbon clathrate. In preferred embodiments, energy is added to the mixture in the form of kinetic energy. In further preferred embodiments, hydrogen evolves at moderate temperature and moderate pressure from the produced hydrogenated carbon material including a hydrogen-carbon clathrate.

In a particular embodiment, a combined moderate-temperature and moderate-pressure hydrogen production-storage process includes adding kinetic energy to a mixture of coal and a hydrocarbon under reaction conditions including moderate-temperature and moderate-pressure.

Figure 3:
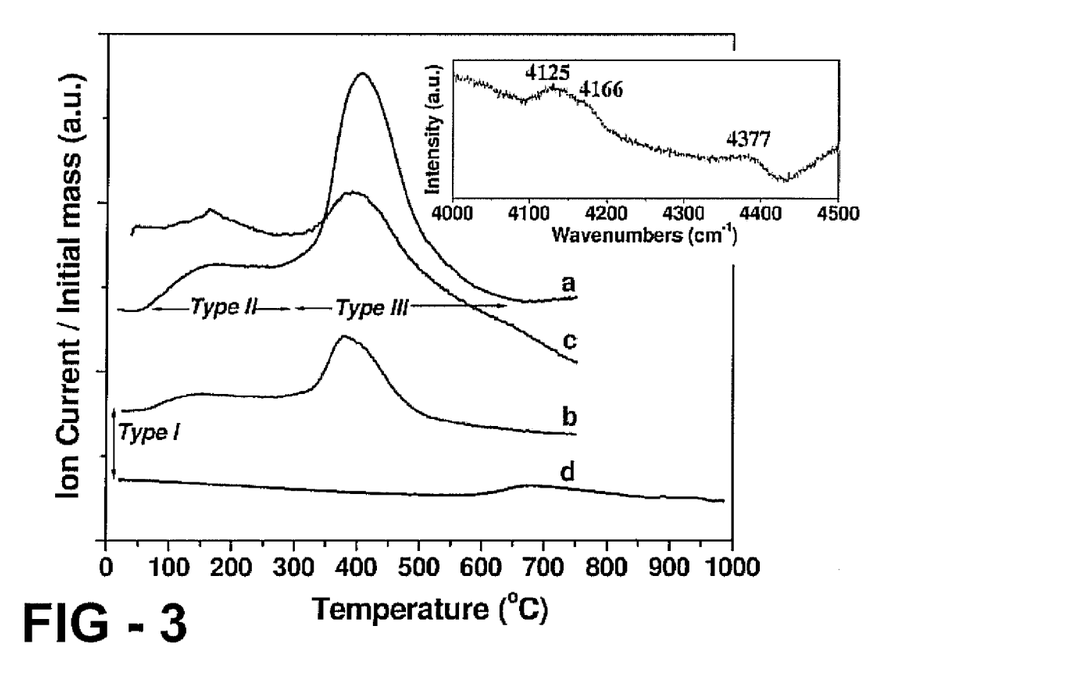
FIG. 3 illustrates hydrogen evolution upon heating, normalized per initial sample mass for (a) BMT-80CH after storage in air for three days; and (b) BMT-80CH after air exposure for 30 days; (c) a separate preparation of BMT-80CH with air exposure only during sample transfer, and (d) the BMT-80CH coal precursor; the inset to this graph shows visible Raman spectra of BMT-80CH after one year, which matches molecular hydrogen and demonstrates the trapping of molecular hydrogen in this material to form a hydrogen-carbon clathrate.

For example, reactive ball milling of anthracite coal, in a particular example $\sim CH_{0.17}$ anthracite coal although others are suitable, and cyclohexene ($C_6H_{10}$) under reaction conditions including moderate-temperature and moderate-pressure, produces hydrogenated forms of amorphous carbon and trapped molecular hydrogen, with Raman-active molecular hydrogen vibrations apparent in samples stored in air for over one year, see for example FIG. 3, inset. The incorporated hydrogen evolves slowly at room temperature, increases significantly at 60° C. due to catalytic dehydrogenation of hydrocarbons in the sample, and increases again at 300° C. for a third type of hydrogen that is chemically bound hydrogen. Hydrogen which is "chemically bound" is also referred to as "non-molecular hydrogen" herein and refers to non-molecular hydrogen, such as hydrogen bonded to carbon. Room temperature evolution of hydrogen from a hydrogenated material of the present invention is a result of molecular hydrogen "strapped" in the material in a metastable carbon-hydrogen clathrate.

A combined hydrogen production-storage process according to embodiments of the present invention offers improved overall system efficiency. Modification of low-cost anthracite coals into hydrogenated carbon materials, including hydrogen-carbon clathrate materials, that evolve hydrogen provide a viable alternative to solid-state hydrogen storage materials that rely on reversible thermodynamics, for which DOE storage targets are difficult, if not impossible, to achieve. Since separate processes of hydrogen production and hydrogen storage come at an energy penalty, a combined storage and production process that traps molecular hydrogen within a sequestered carbon matrix reduces energy and material costs of hydrogen production and storage associated with a separate storage step having associated material production and adsorption energy penalties. Embodiments of a process according to the present invention provide for combined synthesis of a hydrogen storage material, hydrogen generation and/or release from a hydrogen source and storage of the hydrogen in the hydrogen storage material, obviating the need for separate generation of a hydrogen storage medium, separate generation of hydrogen, and transport of hydrogen to the hydrogen storage medium for storage.

A process according to the present invention provides a novel moderate-pressure and moderate-temperature synthesis route to produce a hydrogenated carbon material including a hydrogen-carbon clathrate. The term "hydrogen-carbon clathrate" as used herein is intended to refer to a synthesized cross-linked cage-like carbon structure in which molecular hydrogen is trapped.

A hydrogen-carbon clathrate according to an embodiment of the present invention is characterized by Raman-active $H_2$ vibrations measured at ambient conditions without hydrogen over-pressure and diffusion-limited room temperature $H_2$ evolution.

The terms "moderate pressure" and "moderate temperature" as used herein are used to refer to reaction and/or hydrogen evolution conditions used in embodiments of methods of hydrogen generation, synthesis of hydrogenated carbon material including hydrogen-carbon clathrates and/or evolution of hydrogen from hydrogenated carbon material.

For instance, reaction conditions may include a pressure in the range of about 0-50 atm, inclusive. A "moderate pressure" reaction condition is preferably a pressure in the range of about 0-10 atm, inclusive. Reaction conditions may also include a temperature in the range of about 0-550° C., inclusive. A moderate temperature reaction condition is preferably in the range of about 0-100° C., inclusive and further preferably in the range of about 10-40° C., inclusive. Reaction conditions in the room temperature range are specifically included as "moderate temperature" reaction and/or hydrogen evolution conditions. As noted, reaction conditions are achieved without addition of heat to a reactor in particular embodiments. Thus, reaction conditions including temperatures above ambient temperature are typically due to friction and/or other operational sources of heating.

Hydrogen evolution conditions are selected to promote evolution of hydrogen at a desired speed. It is a characteristic of methods and compositions according to particular embodiments of the invention that hydrogen is evolved from a hydrogenated carbon including a hydrogen-carbon clathrate of the present invention at room temperature, indicative of the presence of a hydrogen-carbon clathrate. However, molecular hydrogen trapped in a hydrogen-carbon clathrate generally evolves more quickly at temperatures above room temperature and thus hydrogen evolution conditions optionally include temperatures above room temperature. Further, in particular embodiments, hydrogen evolution conditions include heating to a temperature such that non-molecular hydrogen is evolved from an inventive material. Thus, hydrogen evolution conditions generally include a temperature in the range of about 0-400° C., but are not limited to this range. A desirable temperature for hydrogen evolution will depend on the application and will be recognized by one of skill in the art.

A process for making a hydrogenated carbon material including a hydrogen-carbon clathrate is provided which includes making a hydrogenated carbon material including a hydrogen-carbon clathrate under moderate temperature and moderate pressure conditions. An exemplary process includes forming a mixture of a carbon source, such as a carbonaceous material, and a hydrogen source and reacting the mixture under system reaction conditions such that hydrogen is released from the hydrogen source, molecular hydrogen is generated, an amorphous diamond-like carbon material is formed, and at least a portion of the hydrogen released from the hydrogen source is associated with the amorphous diamond-like carbon as molecular hydrogen. For instance, such system reaction conditions may include a pressure in the range of about 0-50 atm, inclusive, or more preferably, a pressure in the range of about 0.9-10 atm, inclusive. System reaction conditions may also include a temperature in the range of about 0-550° C., inclusive, or more preferably, in the range of about 10-100° C., inclusive. In a further preferred embodiment, system reaction conditions are in the room temperature range. In a specific embodiment, no heat is added to a reaction system other than that resulting from friction or other operational sources.

In certain other embodiments, an amorphous diamond-like material is formed in the presence of molecular hydrogen and molecular hydrogen is stored in the amorphous diamond-like material nearly simultaneously with formation of the amorphous diamond-like material, producing a hydrogenated carbon material including a hydrogen-carbon clathrate according to the invention.

A process for making a hydrogenated carbon material is provided according to the present invention which includes adding energy to a mixture of a carbon source and a hydrogen source such that a hydrogenated carbon material including a hydrogen-carbon clathrate is formed, including trapped molecular hydrogen.

The terms "mixture" and "mixed" are used herein to describe presence of a carbon source and a hydrogen source together, as in a container. The carbon source and hydrogen source in the mixture may be in the same or different states, i.e. a solid carbon source and a hydrogen source in liquid form, a solid carbon source and a gaseous hydrogen source, and other such permutations such as will be recognized by one of skill in the art.

The term "carbon source" as used herein refers to a material including carbon in a form capable of forming a diamond-like carbon structure when combined with energy, particularly kinetic energy. A preferred carbon source in particular embodiments includes an acene. Acenes illustratively include compounds having the general formula $C_{2x-6}H_x$. Specific examples of acenes include naphthalene, anthracene, tetracene, pentacene hexacene, heptacene and octacene. A larger carbon structure including an acene is a carbon source. For example, in an amorphous and/or crystalline carbonaceous material such as anthracite may include an acene.

A carbon source is optionally used in solid form to produce a material including a hydrogenated carbon material in embodiments of the present invention. Alternatively or in addition, a liquid carbon source is optionally used. For example, petroleum is an example of a liquid carbon source.

A suitable carbon source is a carbonaceous material including amorphous carbon and/or crystalline carbon. The term "carbonaceous material" as used herein is intended to refer to a material enriched in amorphous carbon and/or crystalline carbon.

In one preferred embodiment, a carbonaceous material is substantially solid under conditions used in an inventive process.

In further preferred embodiments, a carbonaceous material is a material containing 30-100% by weight carbon in an amorphous and/or crystalline form. Further preferred is a carbonaceous material which contains at least 50% by weight carbon in an amorphous and/or crystalline form. Still further embodiments include a carbonaceous material which contains at least 75% by weight carbon in an amorphous and/or crystalline form. In some embodiments, a carbonaceous material which contains at least 90% by weight carbon in an amorphous and/or crystalline form is used.

An illustrative carbonaceous material is coal. Examples of coals which may be used include anthracite, lignite, bituminous, sub-bituminous, waste coal, and a combination of two or more of these. Preferred coals include anthracites. Anthracites are a class of highly graphitic coals, in which substituted heteroatoms within the graphene layers leads to inter-layer cross-linkages, curvature, and a decreased thermodynamic stability relative to graphite. Anthracites typically include about 90-96% carbon by weight, about 2-4% hydrogen by weight and less than about 8% oxygen and/or nitrogen by weight. Other heteroatoms, such as sulfur, and mineral matter is generally small.

Another example of a suitable coal includes a coal containing both amorphous carbon and a crystalline carbon. It will be appreciated by those of skill in the art that coal includes carbon along with other materials such as inherent mineral matter. Hydrogen is also present in coal, chemically bound to carbon, and may serve as a hydrogen source for an inventive process.

Further exemplary carbonaceous materials include waste biomass.

A carbonaceous material may further include a second material. For example, a second material is selected from the group including a transition metal, an alkaline earth metal, an alkali metal, a non-metal, and a combination thereof. In certain embodiments, such a second material is present in amounts in the range of 0.001-40% by weight of the carbonaceous material. In a further embodiment, a second material is present in an amount in the range of 0.005-1% by weight of the carbonaceous material. Still further, the second material is present in an amount in the range of 0.01-0.1% by weight of the carbonaceous material. In addition, combinations of such materials may be present.

In particular embodiments, a hydrogen source is "non-molecular hydrogen," that is hydrogen bonded to another element, such as carbon or nitrogen. Where a hydrogen source is "non-molecular hydrogen," the hydrogen source may be reacted or processed so as to release molecular hydrogen and/or hydrogen bound to another element, from the hydrogen source for association with an amorphous diamond-like material to form a hydrogenated carbon material including a hydrogen-carbon clathrate according to an inventive process.

A hydrogen source may be supplied as a separate material for mixture with the carbonaceous material. Thus, a hydrogen source may be exogenous to the carbonaceous material. In addition, a hydrogen source may be endogenous to the carbonaceous material. For example, particular coals include both a carbonaceous material and a hydrogen source. Both an endogenous and an exogenous hydrogen source may be included in a mixture in a process to produce a hydrogenated carbon material according to the invention in certain embodiments.

A suitable hydrogen source in one embodiment of an inventive process is a hydrocarbon. For example, an illustrative suitable hydrocarbon includes an unsaturated hydrocarbon, such as a substituted or unsubstituted, linear, cyclic or branched alkene or alkyne. In a further example, a preferred suitable hydrocarbon includes an olefin, such as cyclohexene. A particular class of olefins which may be used in one embodiment of an inventive process includes acenes.

Another type of hydrogen source is a saturated hydrocarbon, such as a substituted or unsubstituted, linear, cyclic or branched alkane.

In a further embodiment, a hydrogen source includes an inorganic hydrogen-containing material. An example of an inorganic hydrogen-containing material is a metal hydride. Another example of an inorganic hydrogen-containing material is ammonia and ammoniated compounds.

A hydrogen source may be molecular hydrogen in one embodiment. In particular embodiments, a hydrogen source may be a gas, such as hydrogen gas. In particular embodiments, no molecular hydrogen is added as a hydrogen source.

A hydrogenated carbon material including a carbon-hydrogen clathrate according to the present invention typically includes an atomic ratio of carbon to hydrogen in the range of about 1:0.1-1:4, although inventive processes are not limited to a ratio in this range.

In particular embodiments, iron is present in a product of high energy kinetic milling of a carbon source, such as a hydrogenated carbon material including a carbon-hydrogen clathrate, in amounts in the range of 1-40%, typically 10-20% of the total weight of the milled product.

A hydrogenated carbon material including a carbon-hydrogen clathrate according to the present invention includes molecular hydrogen. In further embodiments, a carbon-hydrogen clathrate according to the present invention includes bonded hydrogen. Additionally, adsorbed hydrogen may be included in a hydrogenated carbon material including a carbon-hydrogen clathrate according to embodiments of the present invention.

In a preferred embodiment, energy is added to a mixture of a carbon source and a hydrogen source by a high kinetic energy mixing process, such as high kinetic energy milling. A preferred high kinetic energy milling process is ball milling. Further high kinetic energy milling processes which may be applicable include rod milling and hammer milling, for example.

Energy added to a mixture is sufficient to produce an amorphous diamond-like material is formed. Further, energy added is sufficient to permit hydrogen generation and or release from a hydrogen source and association of the hydrogen with the amorphous diamond-like material to form a hydrogen-carbon clathrate. Reaction conditions may influence the energy added and reaction conditions include parameters under which a ball milling apparatus is run. For example, a ball milling apparatus is run in "impact mode" in a preferred embodiment.

In one embodiment of a process according to the present invention, a carbon source and a hydrogen source are mixed prior to ball milling or other energy addition step. In other embodiments, a carbon source and a hydrogen source are mixed during ball milling or other energy addition step.

Further, in another embodiment, a carbon source may be subjected to ball milling or other energy addition process prior to mixing with a hydrogen source. Thus, a process for making a hydrogen-carbon clathrate according to one embodiment of the invention includes adding energy to a carbon source such that amorphous diamond-like material is formed. Subsequently, a hydrogen source is brought into contact with the amorphous diamond-like material and the hydrogen becomes associated with the amorphous diamond-like material, forming a hydrogen-carbon clathrate. Thus, in certain embodiments, an amorphous diamond-like material is formed independently of hydrogen generation and/or storage.

A dehydrogenation material is provided according to embodiments of the present invention. A provided dehydrogenation material is produced in embodiments including adding energy, particularly kinetic energy to a carbon source, and optionally, a hydrogen source, producing a dehydrogenation material effective to dehydrogenate a hydrogenated material. In preferred embodiments, a transition metal is present in a mixture to which energy is added to produce a dehydrogenation material. For example, high kinetic energy milling of a coal, such as an anthracite coal produces a dehydrogenation material active to dehydrogenate a hydrogenated material, producing hydrogen and/or a dehydrogenated material. In a further example, high kinetic energy milling of a coal, such as an anthracite coal in a mixture including a hydrogen source, such as cyclohexene, produces a dehydrogenation material active to dehydrogenate a hydrogenated material. A transition metal present in the mixture may be added to the mixture, be extracted from a reaction vessel, such as a ball mill, and/or be present in a carbon source and/or hydrogen source.

In further embodiments, a composition according to the present invention including diamond-like carbon material is a dehydrogenation material effective to dehydrogenate a hydrogenated material. Thus, in further embodiments, an amorphous diamond-like material is formed in a process according to the present invention including adding kinetic energy and a carbon source. The amorphous diamond-like material is brought into contact with a hydrogen source to generate hydrogen and/or produce a dehydrogenated product. A process for generating molecular hydrogen is therefore provided according to the invention which includes contacting an amorphous diamond-like carbon material and a hydrogen source under reaction conditions such that hydrogen is released from the hydrogen source, thereby generating molecular hydrogen.

In addition to high energy milling, energy may be added by heating and/or by increasing pressure in some inventive processes. It is appreciated that a combination of a high kinetic energy mixing process, heating and increased pressure is suitable for use in an embodiment of an inventive process of making a hydrogenated carbon product.

An inventive process may include use of a mixture of a carbonaceous material and a hydrogen source wherein the mixture also includes a transition metal. As noted above, the transition metal may be endogenous to the carbonaceous material and thus introduced into the mixture along with the carbon source via the carbonaceous material. Further, a transition metal may be added to the mixture separately.

Also, a transition metal may be added following generation of the amorphous diamond-like material. Thus, for example, energy may be added to a carbon source to generate anamorphous diamond-like material. Subsequently, a transition metal may be mixed with the crystalline carbon material and/or amorphous diamond-like material and/or hydrogen source in a process to generate and/or release hydrogen. Further, a transition metal may be mixed with the amorphous diamond-like material and/or hydrogen source in a process to store hydrogen, generating a hydrogenated carbon material.

A transition metal may be present in an amount in the range of 0.001-40% by weight of the carbonaceous material. In a further embodiment, a transition metal is present in an amount in the range of 0.005-1% by weight of the carbonaceous material. Still further, the transition metal is present in an amount in the range of 0.01-0.1% by weight of the carbonaceous material.

Also detailed is a process of producing hydrogen according to the present invention which includes providing a carbonaceous material, a hydrogen source, and a transition metal; and mixing the carbonaceous material, the hydrogen source, and the transition metal, thereby generating and/or releasing hydrogen from the hydrogen source and producing molecular hydrogen. In one embodiment, mixing may be low energy and/or high energy mixing.

In further embodiments a mixture including a carbonaceous material and a hydrogen source may further include a metal, an alkaline earth metal, an alkali metal, a non-metal, or a combination of these. Similarly, such materials may be added to an amorphous diamond-like material and/or hydrogen source in a process to generate hydrogen. Such materials may also be mixed with the amorphous diamond-like material and/or hydrogen source in a process to store hydrogen, generating a hydrogenated carbon material.

In one embodiment of an inventive process for making a hydrogenated carbon and/or for generating hydrogen, a carbon source is treated prior to use in the process. For example, the carbon source may be treated to decrease an amount of an undesired substance. For instance, a carbonaceous material, such as coal, may include material which does not contribute to hydrogen storage. At least a portion of such material may be removed by one or more treatments designed to accomplish the removal. In addition, at least a portion of such material may be treated to alter the material to increase its ability to contribute to hydrogen storage. For example, washing or incubation of the carbonaceous material in one or more acids or bases is an illustrative method of removing and/or altering an undesired component of the carbonaceous material. Suitable acids include HCl, nitric acid, hydrofluoric acid, among others. Suitable bases include NaOH, among others.

A particular advantage of an embodiment of an inventive composition and process is the ability to both generate hydrogen and store the generated hydrogen. Such a composition and process allow for significant cost and time savings by eliminating the need and equipment used for transport of generated hydrogen to a separate storage material, pressurization and heat transfer of separately generated hydrogen.

At least a portion of the molecular hydrogen is reversibly associated with the hydrogenated carbon material such that at least a portion of the molecular hydrogen may be eluted from the hydrogenated carbon material for use, for instance, as a fuel to power a device.

Evolution of molecular hydrogen from a hydrogenated carbon material according to the present invention is accomplished by techniques such heating and/or irradiating the hydrogenated carbon material according to the present invention and/or passing an inert sweep gas over the hydrogenated carbon material.

A process for supplying hydrogen at a desired location is provided according to the present invention which includes providing a hydrogenated carbon material and transferring a portion of the hydrogen from the hydrogenated carbon material to a desired location, such as a device powered by hydrogen fuel.

A composition is provided which includes a hydrogenated carbon material including a hydrogen-carbon clathrate. A hydrogen-carbon clathrate includes an amorphous diamond-like carbon, and molecular hydrogen associated with the amorphous diamond-like carbon. Amorphous diamond-like carbon is a metastable carbon which includes a variety of carbon structures and compositions. Amorphous diamond-like-carbon (DLC) includes $sp^3$ and $sp^2$ carbon structures, where $sp^2$-bonded graphite-like clusters are embedded in an amorphous $sp^3$-bonded carbon matrix. It is not intended that the term diamond-like carbon to be limited to thin coatings, as it is sometimes (but not exclusively) used in the literature.

Hydrogen may be associated with carbon in an inventive hydrogenated carbon material in a variety of ways, such as by bonded and/or non-bonded association with an amorphous diamond-like carbon. One type of hydrogenated carbon material according to the invention is a hydrogen intercalated carbon material.

In a preferred embodiment, at least a portion of the hydrogen present in a hydrogenated carbon material of the present invention is molecular hydrogen is associated with a carbon material by being "trapped" in the carbon material, such that a hydrogenated carbon material includes a hydrogen-carbon clathrate. Trapping of molecular hydrogen in a hydrogen-carbon clathrate form is indicated by diffusion-limited release characteristics of at least a portion of the hydrogen associated with the hydrogenated carbon material. In addition, trapping of molecular hydrogen in a hydrogen-carbon clathrate form is detected by Raman spectroscopy indicating a characteristic vibration for molecular hydrogen, for instance as illustrated in FIG. 3, inset.

In addition to including "trapped" molecular hydrogen in a hydrogen-carbon clathrate, a hydrogenated carbon produced according to the methods of the present invention may also include hydrogen bonded to another atom, such as carbon, in an inventive hydrogenated carbon material. At least a portion of hydrogen bonded to carbon in a hydrogenated carbon material according to the present invention reacts or degenerates to form molecular hydrogen. Thus, an inventive hydrogenated carbon material includes hydrogen bonded to carbon which is a precursor to molecular hydrogen. Hydrogen evolution occurs as metastable hydrogenated carbon rearranges into more thermodynamically stable carbon forms and generates molecular hydrogen. Such rearrangement and molecular hydrogen evolution may occurs at moderate temperatures and pressures and may be stimulated by heating, irradiation and other methods of promoting rearrangement of the metastable hydrogenated carbon into more thermodynamically stable carbon forms.

Embodiments of inventive compositions and methods are illustrated in the following examples. These examples are provided for illustrative purposes and are not considered limitations on the scope of inventive compositions and methods.

EXAMPLES

Example 1

Buck Mountain PSOC-1468 coal, (abbreviated as 'BMT') from the Penn State University coal sample bank is used in this example. BMT is an anthracite coal from the bottom of the Llewellyn formation the Buck Mountain Seam, collected from Luzerne Co., PA. BMT has a low volatile matter content (3.65 wt %, dry) and high fixed carbon content (89.52 wt %, dry). The ash content of the coal precursor is relatively low for a naturally occurring coal (6.6%), consisting primarily of naturally occurring minerals; neutron activation analysis (NAA) of the coal precursor indicated traces of Aluminum, Antimony, Arsenic, Barium, Bromine, Cerium, Chromium, Hafnium, Iron, Lanthanum, Magnesium, Potassium, Scandium and Tungsten. The amount of silicon present in the coal precursor is not currently known, as differentiation between Al and Si is difficult via NAA. The low volatile matter content, high fixed carbon content, and low ash content make BMT coal the most 'graphitic' of coals of an initial screening. Neutron activation analysis (NAA) of BMT quantified the inherent mineral matter to be comparable to metals introduced during milling (Fe, Ni, Cr); thus, BMT coal is used 'as received' from the Penn State Coal Sample Bank without purification to remove the inherent mineral matter in this example.

Example 2

A Fritsch Pulveristte LC-106A with stainless steel components (316 SS) is used to ball mill the samples at 400 rpm. BMT coal and powdered graphite (Carbone) are ball milled for 1, 5, 10, 20 80 or 160 hours, both with and without a cyclohexene (J T Baker, 99%) wetting agent added at a 3.3 milliliter per gram of coal ratio. In further examples, a ratio of cyclohexene to coal of 8.25 is used. All milling occurred under a 1 bar argon atmosphere to minimize oxidation effects and water contamination during processing. The entire milling process is conducted intermittently (10 minutes on followed by 5 minutes off) to minimize heating effects during milling. BMT refers to the Buck Mountain coal and BMT-80CH refers to Buck Mountain Coal milled for 80 hours in cyclohexene.

Example 3

Electron micrographs are obtained via transmission electron microscopy (TEM) on a JEOL 2010F at 200 kV. Energy-dispersive X-ray (EDX) spectra are taken on select samples during TEM analysis. X-Ray Diffraction measurements are taken with Rigaku Geiger Philips MPD operated with Cu K radiation operated at 30 kV and 50 mA. Raman spectroscopy is Raman spectroscopy is done on a Renishaw in Via spectrometer with a confocal Leica DM LM microscope and a Peltier cooled RnCam dd-CCD with a frequency doubled 488 nm argon ion laser to obtain 244 nm UV.

Example 4

A Thermogravimetric Analyzer, TGA 2050 interfaced to a ThermoStar Mass Spectrometer is employed to study the thermal desorption of hydrogen from the samples. UHP Argon is flowed as a carrier gas with a flow rate of 100 ml/min while samples are heated up from room temperature to 1000° C. at 10° C./min. During the measurement the pressure inside the vacuum system (quadrupole mass spectrometer) is in the range of $1.7 \times 10^{-6}$ mbar. In order to quantify the hydrogen released from the samples, the hydrogen signal is calibrated using $TiH_2$ as a standard, assuming the $TiH_2$ contain to be 4.0 wt. % of hydrogen (verified with the gravimetric analyzer). The calibration curve is constructed by plotting $\int Ion$ current $(H_2)dT$ vs $m(H_2)$ for different quantities of $TiH_2$ (8, 23, and 55 mg).

Example 5

Figure 2A:
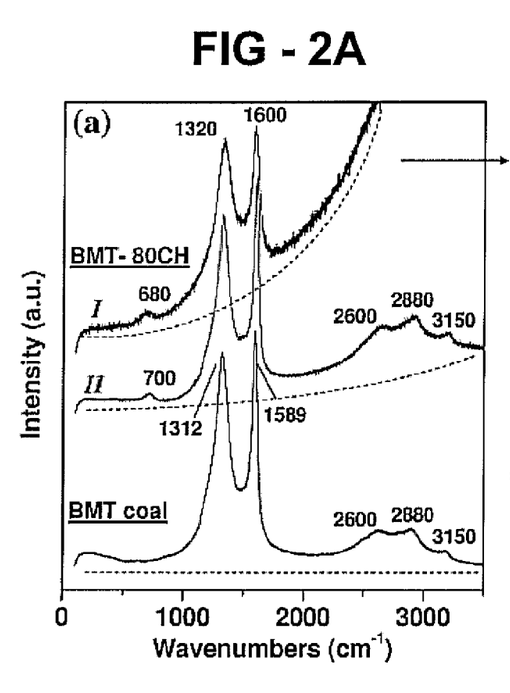
FIG. 2A is a graph illustrating Raman Spectra of the BMT anthracite coal precursor as well as reactive ball milling products, that is, hydrogen-carbon clathrates, showing photoluminescence at visible excitation (I) that continues one year after synthesis (II)

FIG. 2A shows Raman Spectra of the BMT anthracite coal which is typical for an ordered carbon network with some degree of hydrogenation, including a strong graphite peak (G peak at ~1600 $cm^{-1}$), defect sp2 band (D peak at ~1350 $cm^{-1}$), corresponding secondary reflections (D' at 2600, G' at 3150), and a peak at ~2880 $cm^{-1}$ attributable to the hydrogen inherent to the coal (~CH0.17).

Reactive ball milling results in sample photoluminescence at visible excitation (I) that continues one year after synthesis (II), FIG. 2A. Reactive ball milling of BMT coal with cyclohexene (BMT-80CH) changed the Raman spectra significantly: a high degree of photoluminescence in visible Raman swamped the standard D and G peak, FIG. 2A. Dashed lines reflect observed background photoluminescence. Subsequent analysis shows that the photoluminescence is due to hydrogenation of the sample during ball milling. Ferrari and Robertson have shown empirically the slope of the visible Raman spectra (at 514 nm wavelength excitation) increases exponentially with increasing hydrogenation of amorphous carbons, see Casiraghi, C. et al., J. Phys Rev B, 2005, 72. In this example, molecular hydrogen is not added to the mill, indicating that both BMT coal and the BMT-80CH product dehydrogenate cyclohexene, which is originally added as a lubricant, under the moderate reaction conditions used, including moderate reaction temperature and moderate reaction pressure. This is described in more detail in Figures and text relating to TG-MS data.

Figure 2B:
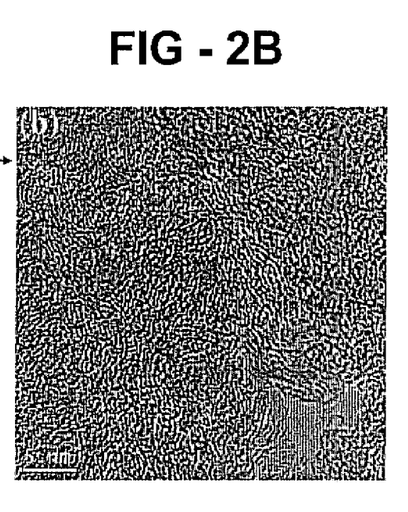
FIG. 2B shows a representative HRTEM micrograph of BMT-80CH indicating an amorphous carbon structure.

FIG. 2B shows a representative HRTEM micrograph of BMT-80CH indicating an amorphous carbon structure. Based on naming conventions in the literature and hydrogen content, material produced by reactive ball milling of BMT coal with cyclohexene, exemplified by BMT-80CH, is within the broad class of diamond-like carbon and in the subset of hydrogenated tetrahedral amorphous carbon. More particularly, such material is identified herein as a hydrogen-carbon clathrate.

Clathrate formation is consistent with demonstrated hydrogen evolution, photoluminescence in Raman spectroscopy, high frequency Raman vibrations, and additionally, observation of nanocrystalline diamond regions following thermal and/or other post-treatments such as acid and/or base treatment of BMT-80CH.

Without wishing to be bound by theory, it is believed that discontinuities and dangling bonds in the quasi-graphitic structure of BMT may contribute to reactivity with an unsaturated hydrocarbon, here, cyclohexene, in the ball mill and chemical reactions leading to structural transformation may occur, including free radical, Diels Alder and hydrogen abstraction reactions. BMT-80CH is believed to exhibit oxidation behavior characteristic of a "non-graphitizing" coal, whereas BMT is "graphitizing." This behavior may be attributed to crosslinks, tight cross-linking within the coal structure may serve to "trap" molecular hydrogen and lead to the high-frequency Raman vibrations. Alternatively, the hydrogen may play a role in the formation of cross-linkages, similar to that demonstrated for hydrogen-induced crystallization of silicon, in which Si—H—Si bonds are present, see Sriraman, S. et al., Nature, 2002, 418, 62.

Example 6

As BMT-80CH is heated, it evolves hydrogen at a lower temperature than previously reported for graphite ball milled in high-pressure hydrogen, illustrating a characteristic of a novel hydrogenated carbon material synthesized. FIG. 3 illustrates hydrogen evolution upon heating, normalized per initial sample mass for (a) BMT-80CH after storage in air for three days; and (b) BMT-80CH after air exposure for 30 days; (c) a separate preparation of BMT-80CH with air exposure only during sample transfer, and (d) the BMT-80CH coal precursor. Visible Raman spectra collected under atmospheric conditions for a BMT-80CH sample stored in air for one year (inset), shows perturbed molecular hydrogen vibrations characteristic of hydrogen interacting with a material.

The term hydrogen source is applied to cyclohexene as its dehydrogenation during milling leads to the following observations of molecular hydrogen evolution with thermogravimetic-mass spectroscopy (TG-MS) analysis. With combined thermal gravimetric analysis and mass spectroscopy (TG-MS), an immediate baseline increase in the hydrogen signal (m/z=2) is noted for three different measurements and two different preparations of this sample (FIG. 3, a-c): No increase in baseline is observed upon loading the $TiH_2$ calibration standards nor the BMT coal precursor. The qualitative behavior is the same whether the sample is stored under atmospheric conditions for 3 days (FIG. 3a), 30 days (FIG. 3b), or freshly prepared with minimal air exposure during sample transfer FIG. 3c). All three samples have the same qualitative behavior: an immediate increase in the hydrogen baseline, Type I hydrogen evolution, the hydrogen signal increases at ~60° C., reaches a local maxima at ~150° C., Type II hydrogen evolution, and then increases significantly at ~300° C. with the maximum evolution occurring at ~450° C., Type III hydrogen evolution. The hydrogen evolution is of three types: diffusion-limited hydrogen evolution at room temperature (Type I), catalytic hydrogen evolution that corresponds at least partially to cyclohexene desorption and subsequent dehydrogenation (Type II), and trapped molecular hydrogen that has no corresponding hydrocarbon peak (Type III). It is noted that the intensity of Types I and II hydrogen evolution does not fully correlate with cyclohexene desorption. Type I and II hydrogen evolution is found only in samples that had been mixed with cyclohexene and ball milled. The Type III evolution is not accompanied by cyclohexene or benzene evolution.

Type I hydrogen evolution is not associated with either Type II or Type III hydrogen. Comparing the 3-day and 30-day TG-MS profiles suggests the intensity of Type I hydrogen evolution has decreased with sample age and air exposure. The intensity of Type I hydrogen evolution appears to be greater for a freshly prepared sample.

Quantification of this hydrogen evolution is based on $TiH_2$ calibration standards: 2.6% for the 3 day sample; 1.2% for the 30 day sample; 2.3% for a fresh preparation of BMT-80CH. These numbers are based on sample mass loaded into the TG-MS, thus do not capture Type I hydrogen evolution during storage. The hydrogen evolution from the BMT precursor is 0.5% when heated under similar conditions, with a temperature onset at 550° C. and no corresponding Type I baseline increase (FIG. 3d); likely due to 'traditional' gasification of the coal with trace water in the carrier gas.

Figure 9:
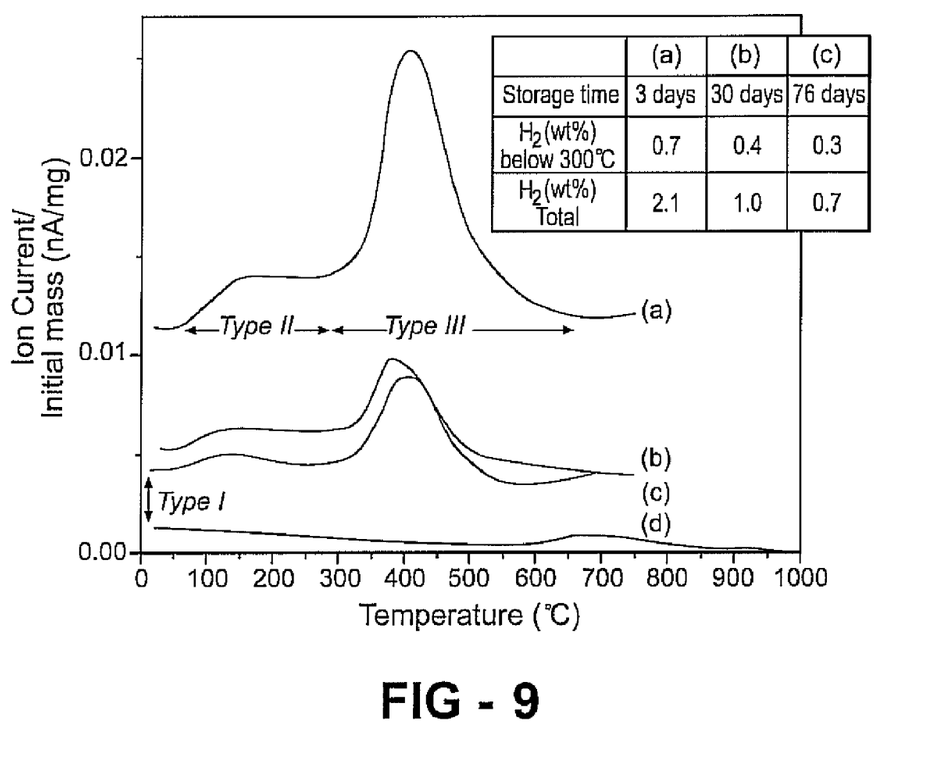
FIG. 9 is a graph illustrating TG-MS evolution (m/z=2) for several preparations of BMT-80CH (a-c) relative to the BMT coal which is a precursor to an inventive hydrogenated material (d); and further shows an inset table summarizing the curve integration relative to a $TiH_2$ calibration. Type I indicates the observed immediate increase in the TG-MS signal, not an arbitrary curve shift.

Overall hydrogen evolution from the onset of sample heating to 750° C. is as much as 2.1 wt % after 3 days of storage under atmospheric conditions as shown in the table present in FIG. 9, inset. Type I and II hydrogen evolution at atmospheric pressure from various BMT-80 CH samples ranges from 0.3 wt %-0.7 wt % depending on sample age, however, these quantifications do not capture hydrogen evolution during storage and sample transfer.

One year after sample preparation, BMT-80CH samples continue to fluoresce in visible Raman as illustrated in FIG. 2a, but with a decreased intensity. A perturbed Q branch vibration for molecular hydrogen (FIG. 3 inset, near 4161 $cm^{-1}$) is present, despite measurement with no hydrogen overpressure. The perturbation of the hydrogen peak to 4125, 4166, and 4377 $cm^{-1}$ is due to interactions of hydrogen with the material, similar to that demonstrated with in situ Raman hydrogen adsorption studies with carbon at cryogenic temperatures in a pressurized hydrogen atmosphere, see Pradhan, B. K. et al., Physica B, 2002, 323, 115; and Centrone, A. et al., Phys Rev B, 2005, 71. The hydrogen vibrations in FIG. 3 inset are a clear indication of both hydrogen production and hydrogen trapping within the material, with slow diffusion-limited evolution in excess of one year, believed to be the first report of its kind.

Residual metals, such as inherent mineral matter and/or introduced Fe, Ni and/or Cr likely play a role in the observed diffusion-limited hydrogen evolution (Type I), the Type II hydrogen evolution associated with catalytic dehydrogenation (Type I), and the Type III bound hydrogen. However, the extent of the uptake can not be accounted for by the metal content of the samples used in this example, which included metals in amounts in the range of about ~5-10%, the Raman molecular hydrogen vibrations and room temperature hydrogen evolution are atypical of metal hydrides. It is noted that metals are present in higher amounts in some samples. The carbon-hydrogen interactions reported here are unique and evidence for clathrate-like structure, in which a carbon cage-structure traps and stabilizes molecular hydrogen is shown.

Example 8

BMT-80CH products are catalytically active to dehydrogenate cyclohexene, as evidenced by the evolution of benzene (m/z=78) and hydrogen (m/z=2). The evolution of cyclohexene, benzene, and hydrogen during the sample heating is monitored by a quadrupole mass spectrometer. Cyclohexene signal is shown at m/z=82. Cyclohexene does not have MS lines at m/z=78, and neither benzene not cyclohexene have MS lines at m/z=2. In addition, dehydrogenated BMT-80CH products, that is, BMT-80CH from which hydrogen has been evolved are also believed to be dehydrogenating materials.

The $TiH_2$ used as a calibration standard was run on different days and showed negligible change in baseline compared to the BMT-80CH samples. The baseline observed for $TiH_2$ standards is approximately the same as the raw coal precursor, that is, BMT, graphite, and samples ball milled without cyclohexene. Therefore QMS signal drift is not the cause for the changes of baseline observed in the samples ball milled with cyclohexene, that is, BMT-CH80. All samples in this example are tested in the period of about 10 weeks on the TG-MS, Table I.

TABLE I

TG-MS data to show baseline fluctuations with sample, time and initial sample mass. Data is listed sequentially, based on date collected after ball milling

| Sample | Initial Ion current for m/z = 2, nA | Initial mass, mg |
|---|---|---|
| BMT-80CH, 3 days after ball milling | 0.3167 | 23.15 |
| BMT | 0.079 | 21.9 |
| $TiH_2$ (1) | 0.083 | 8.05 |
| $TiH_2$ (2) | 0.086 | 23.48 |
| $TiH_2$ (3) | 0.078 | 55.6 |
| BMT-80CH, Ar | 0.1919 | 10.6 |
| BMT-80CH, 30 days | 0.1464 | 19.11 |
| Graphite + CH | 0.075 | 12.29 |
| BMT-80$^{dry}$ + CH | 0.0465 | 11.39 |
| BMT-80CH, 76 days | 0.1091 | 16.79 |

Samples with cyclohexene added directly prior to TG-MS are denoted with "+CH". The initial mass of these samples includes the added cyclohexene.

The baseline of $TiH_2$ and the BMT coal varies within 0.047-0.086 nA; the baseline for graphite with added cyclohexene is 0.075 nA, whereas the baseline for BMT-80$^{dry}$ is 0.0465 nA. The baseline for BMT-80CH samples ranges from 0.11-0.32 nA, with the baseline correlating with sample age: 0.3167 nA 3 days after preparation, 0.1464 nA 30 days after preparation, 0.1091 nA 76 days after preparation. Several samples in which cyclohexene is added immediately prior to the TG-MS run, graphite+CH and BMT-80$^{dry}$+CH have a baseline comparable to the BMT and $TiH_2$ runs. An immediate increase in the hydrogen signal is also observed on a separate quadropole mass spectrometer, VG Quadropole, Sensorlab, immediately after loading BMT-80CH.

Figure 4:
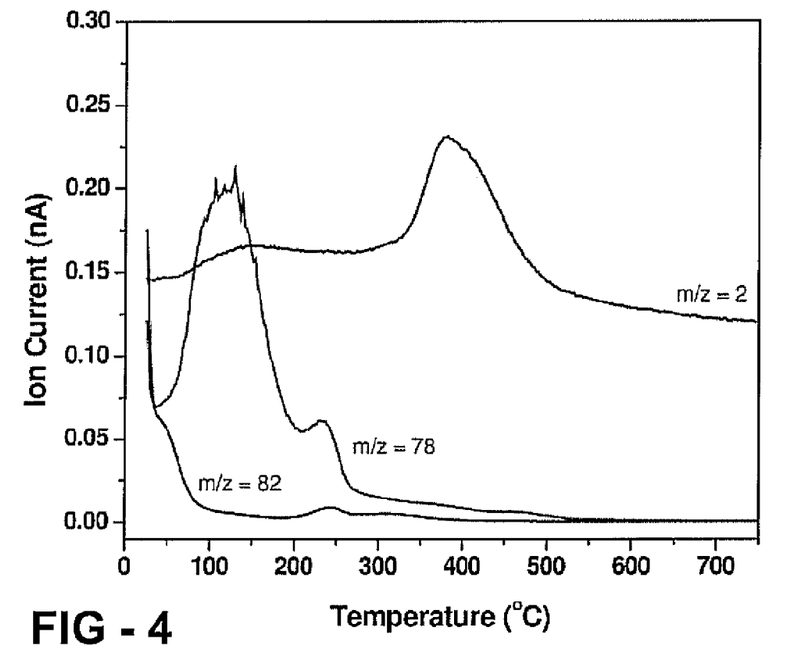
FIG. 4 is a graph illustrating TGA-MS data showing evolution of cyclohexene (m/z=82), benzene (m/z=78), and hydrogen (m/z=2) with temperature, for a BMT-80CH sample stored in air for 30 days.

FIG. 4 shows TGA-MS data illustrating evolution of cyclohexene (m/z=82), benzene (m/z=78), and hydrogen (m/z=2) with temperature, for a sample stored in air for 30 days. The heating rate used is 10° C./min.

FIG. 4 shows TG-MS 30 days after preparation. Other samples analyzed presented similar behavior. For temperatures lower than 60° C. the desorbed cyclohexene shows a decreasing signal, being very small for temperatures higher than 100° C. In the range of 60° C. to 290° C. an increase in the signal of benzene and hydrogen appears, with a peak around 130° C. (benzene) and 150° C. (hydrogen). Since benzene is not added to the sample, this result suggests that a catalytic reaction takes place producing the dehydrogenation of cyclohexene that results in the generation of benzene and hydrogen. At 230° C. a second small peak of benzene is present and this peak is also synchronized with a very small increment of the cyclohexene signal. Dehyrogenation may also occur within the ball mill. Around 300° C. the hydrogen signal continues increasing, having a second peak with a maximum signal at 380° C. At this temperature, the cyclohexene and benzene signal is very low and the observed hydrogen can not be associated with catalytic decomposition of cyclohexene. Thus, this second hydrogen peak results from the desorption of molecular hydrogen trapped in the sample during the ball mill process. The desorption at high temperatures indicates a very slow chemical reaction process is leading to the release of the trapped hydrogen.

Figure 5:
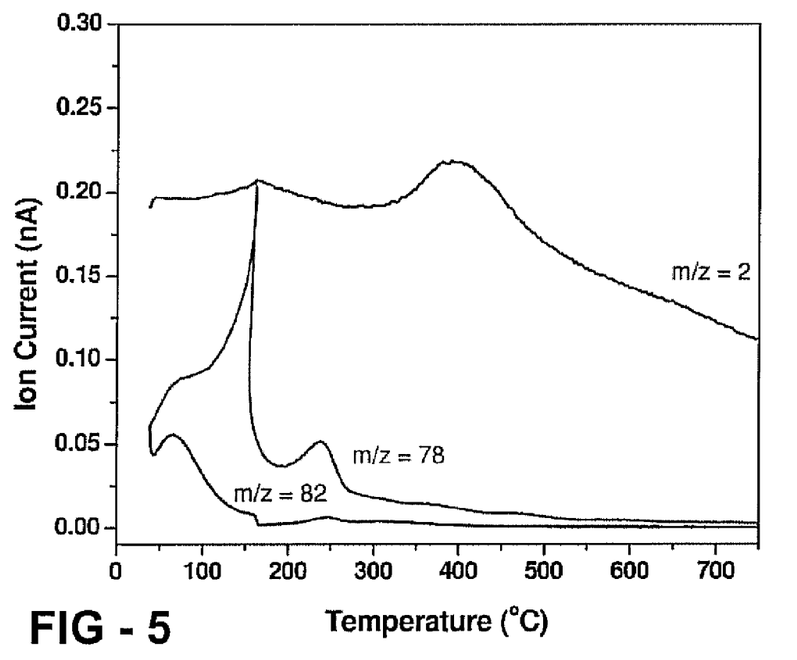
FIG. 5 is a graph illustrating TGA-MS data showing evolution of cyclohexene (m/z=82), benzene (m/z=78), and hydrogen (m/z=2) with temperature, for a BMT-80CH sample stored in Argon for 10 days. The sample is heated at 30° C./min. up to 150° C. and at 10° C./min. for higher temperatures.

FIG. 5 shows TGA-MS data showing evolution of cyclohexene (m/z=82), benzene (m/z=78), and hydrogen (m/z=2) with temperature, for a sample stored in Argon for 10 days. The sample is heated at 30° C./min. up to 150° C. and at 10° C./min. for higher temperatures.

Figure 6:
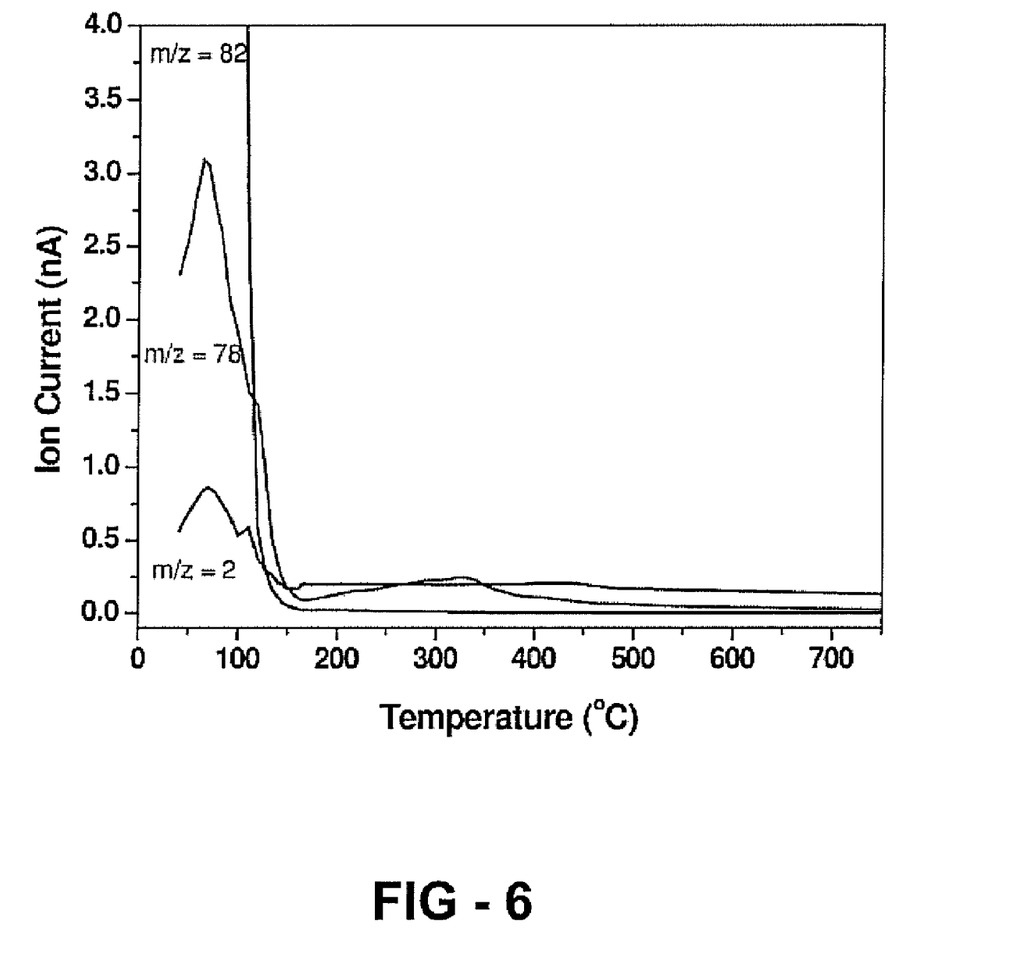
FIG. 6 is a graph illustrating TGA-MS data showing evolution of cyclohexene (m/z=82), benzene (m/z=78), and hydrogen (m/z=2) with temperature, for a BMT-80CH sample stored in Argon for 9 days, then additional cyclohexene is added directly prior to the TG-MS measurement.

FIG. 6 shows TGA-MS data showing evolution of cyclohexene (m/z=82), benzene (m/z=78), and hydrogen (m/z=2) with temperature, for a sample stored in Argon for 9 days. In this case, additional cyclohexene is added to the sample before transfer to the TGA. The sample is heated at 30° C./min. up to 150° C. and at 10° C./min. for higher temperatures.

Figure 7:
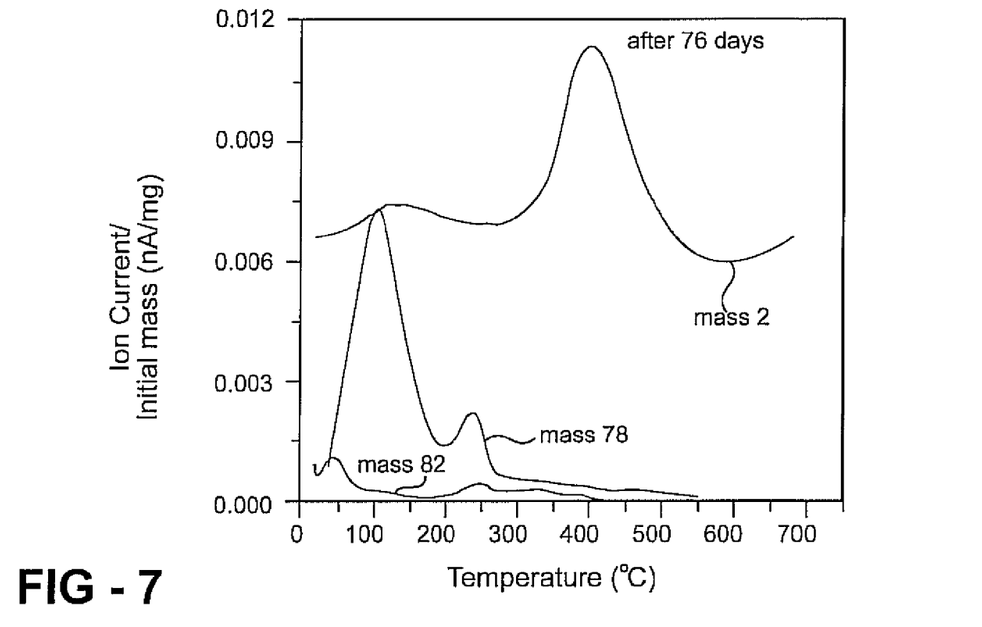
FIG. 7 is a graph illustrating TGA-MS data showing evolution of cyclohexene (m/z=82), benzene (m/z=78), and hydrogen (m/z=2) with temperature, for BMT-80 CH prepared 76 days prior to measurement.

FIG. 7 is a graph illustrating TGA-MS data showing evolution of cyclohexene (m/z=82), benzene (m/z=78), and hydrogen (m/z=2) with temperature, for BMT-80CH prepared 76 days prior to measurement. The hydrogen baseline signal is not fully proportional to the magnitude of the other signals. This figure shows benzene and cyclohexene evolution that accompanies the hydrogen evolution shown in FIG. 9 corresponds to the line labeled "c". Similarly, FIG. 4 corresponds to the line labeled "b" in FIG. 9.

The data indicate that cyclohexene remains in the sample after ball milling but the cyclohexene evolution decreases significantly from 30 to 76 days. 76 days after preparation a small amount of cyclohexene evolves from the BMT-80CH sample with slight heating. Despite the decreased cyclohexene signal hydrogen evolution from the two samples is quite similar: Below 300° C., 0.4 wt % and 0.3 wt % evolve for the 30 and 76 day samples respectively. Thus, hydrogen evolution cannot be attributed solely to cyclohexene dehydrogenation within the TG-MS.

Also evaluated are several carbon-based samples, graphite, BMT-80CH+CH and BMT-80$^{dry}$, with cyclohexene added immediately prior to the TG-MS run. BMT-80$^{dry}$ is a modified version of BMT-80CH with no cyclohexene added during ball milling. Cyclohexene is added at the same ratio, 3.3 ml/g, used in preparation of BMT-80CH described above, however, the cyclohexene is added directly prior to the TG-MS measurement rather than to the ball mill. These samples do not have an increased hydrogen baseline evolution despite the addition of cyclohexene, Table 1. The samples do show evidence of benzene evolution, m/z=78, suggesting cyclohexene evolution may occur within the TG-MS. The dehydrogenation may be catalyzed by either TG-MS system components and/or the BMT samples are catalytically active for cyclohexene dehydrogenation. An example of such behavior is shown in FIG. 8.

Figure 8:
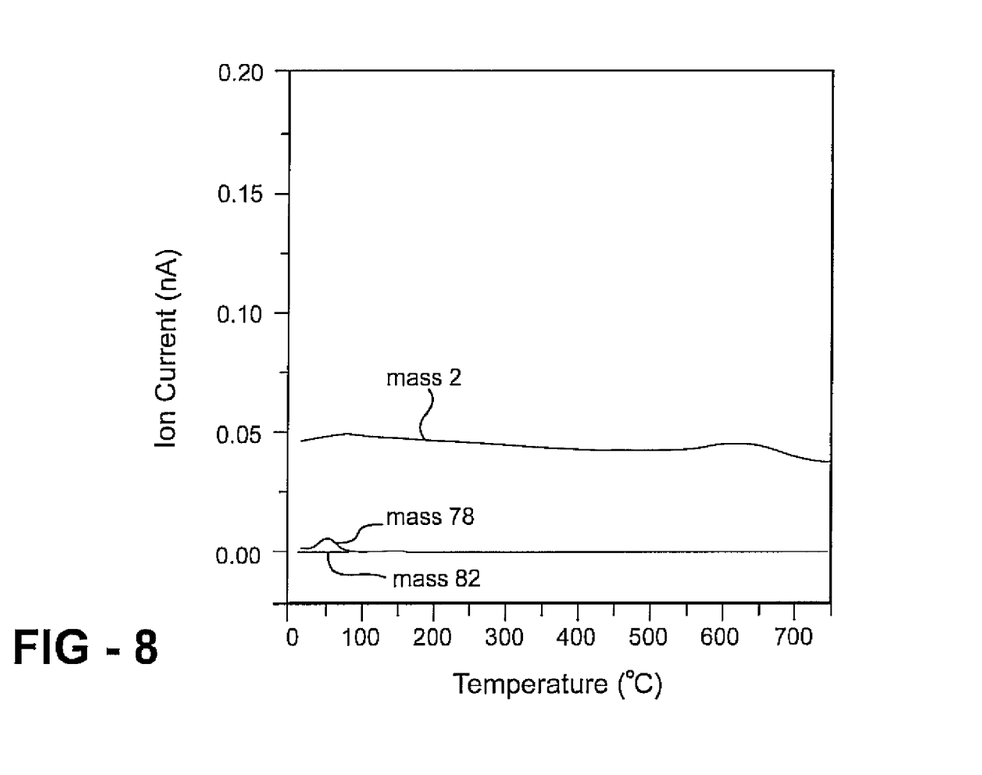
FIG. 8 is a graph illustrating TGA-MS data showing evolution of cyclohexene (m/z=82), benzene (m/z=78), and hydrogen (m/z=2) with temperature, from BMT-80$^{dry}$+CH.

FIG. 8 is a graph illustrating TGA-MS data showing evolution of cyclohexene (m/z=82), benzene (m/z=78), and hydrogen (m/z=2) with temperature, from BMT-80$^{dry}$+CH. Cyclohexene is added directly prior to the TG-MS, but not to the ball mill in the run from which the data in FIG. 8 is taken. Below 100° C., the benzene signal is accompanied by a hydrogen signal, with similar temperature profiles, that is, the qualitative nature of the signals are virtually identical for m/z=2, 78 and 82. A high temperature peak is observed for most carbon-based samples—believed to be attributable to coal gasification with water from the TG-MS system. As the hydrogen and benzene are observed at the same temperature, the hydrogen and benzene evolve at the same time, suggesting cyclohexene dehydrogenation occurs within the TG-MS. This is dissimilar to the TG-MS analysis of BMT-80CH samples shown above in which the benzene, m/z=78, and hydrogen, m/z=2, evolution do not occur at the same temperatures. In particular, absence of a Type III hydrogen peak, ~400° C., that is characteristic of a carbon sample ball milled in with a hydrogen source is notable, providing evidence that a Type III hydrogen peak is a result of hydrogen trapping in BMT-80 CH in the ball mill.

Any patents or publications mentioned in this specification are incorporated herein by reference to the same extent as if each individual publication is specifically and individually indicated to be incorporated by reference. In particular, U.S. Provisional Patent Application No. 60/752,506, filed Dec. 21, 2005, and U.S. Provisional Patent Application No. 60/752,507, filed Dec. 21, 2005, are hereby incorporated by reference in their entirety.

The compositions and methods described herein are presently representative of preferred embodiments, exemplary, and not intended as limitations on the scope of the invention. Changes therein and other uses will occur to those skilled in the art. Such changes and other uses can be made without departing from the scope of the invention as set forth in the claims.

We claim:

1. A combined hydrogen production and reversible hydrogen storage process, comprising:
    adding energy to a mixture of a carbon source comprising an acene and a hydrogen source under moderate temperature and moderate pressure reaction conditions, such that hydrogen is generated and/or released from the hydrogen source, an amorphous diamond-like carbon is formed, and at least a portion of the hydrogen generated and/or released is associated with amorphous diamond-like carbon, forming a hydrogenated carbon material including a hydrogen carbon clathrate, and thereby producing hydrogen and storing hydrogen as stored hydrogen, wherein the mixture further comprises a transition metal.

2. The process of claim 1 wherein energy is added by a high kinetic energy process.

3. The process of claim 2 wherein the high kinetic energy process comprises ball milling.

4. The process of claim 1 wherein the carbon source further comprises a material selected from the group consisting of: a transition metal, an alkaline earth metal, an alkali metal, a non-metal, and a combination thereof.

5. The process of claim 1 wherein the carbon source is a coal.

6. The process of claim 5, wherein the hydrogen source is exogenous to the coal.

7. The process of claim 1, further comprising evolving at least a portion of the stored hydrogen under hydrogen evolution conditions to produce evolved molecular hydrogen.

8. The process of claim 7, wherein the hydrogen evolution conditions comprise moderate temperature conditions.

9. The process of claim 7, further comprising collecting the evolved molecular hydrogen.

10. The process of claim 7, further comprising transporting the evolved molecular hydrogen from a first location to a second location.

11. A process of producing hydrogen from a hydrogen source, comprising:
    contacting an amorphous diamond-like carbon dehydrogenation catalyst and a hydrogen source under dehydrogenation reaction conditions, thereby generating and/or releasing hydrogen from the hydrogen source and producing hydrogen.

12. A combined hydrogen production and reversible hydrogen storage process, comprising:
    adding energy to a mixture of a carbon source comprising an acene and a hydrogen source under moderate temperature and moderate pressure reaction conditions, such that hydrogen is generated and/or released from the hydrogen source, an amorphous diamond-like carbon is formed, and at least a portion of the hydrogen generated and/or released is associated with amorphous diamond-like carbon, forming a hydrogenated carbon material including a hydrogen carbon clathrate, and thereby producing hydrogen and storing hydrogen as stored hydrogen, wherein the carbon source is a coal and wherein the hydrogen source is exogenous to the coal.

13. The process of claim 12 wherein energy is added by a high kinetic energy process.

14. The process of claim 13 wherein the high kinetic energy process comprises ball milling.

15. The process of claim 12 wherein the mixture further comprises a transition metal.

16. The process of claim 12 wherein the carbon source further comprises a material selected from the group consisting of: a transition metal, an alkaline earth metal, an alkali metal, a non-metal, and a combination thereof.

17. The process of claim 12, further comprising evolving at least a portion of the stored hydrogen under hydrogen evolution conditions to produce evolved molecular hydrogen.

18. The process of claim 17, wherein the hydrogen evolution conditions comprise moderate temperature conditions.

19. The process of claim 17, further comprising collecting the evolved molecular hydrogen.

20. The process of claim 17, further comprising transporting the evolved molecular hydrogen from a first location to a second location.

21. A combined hydrogen production and reversible hydrogen storage process, comprising:
    adding energy to a mixture of a carbon source comprising an acene and a hydrogen source under moderate temperature and moderate pressure reaction conditions, such that hydrogen is generated and/or released from the hydrogen source, an amorphous diamond-like carbon is formed, and at least a portion of the hydrogen generated and/or released is associated with amorphous diamond-like carbon, forming a hydrogenated carbon material including a hydrogen carbon clathrate, and thereby producing hydrogen and storing hydrogen as stored hydrogen;
    evolving at least a portion of the stored hydrogen under hydrogen evolution conditions to produce evolved molecular hydrogen; and
    collecting the evolved molecular hydrogen.

22. The process of claim 21 wherein energy is added by a high kinetic energy process.

23. The process of claim 22 wherein the high kinetic energy process comprises ball milling.

24. The process of claim 21 wherein the mixture further comprises a transition metal.

25. The process of claim 21 wherein the carbon source further comprises a material selected from the group consisting of: a transition metal, an alkaline earth metal, an alkali metal, a non-metal, and a combination thereof.

26. The process of claim 21 wherein the carbon source is a coal.

27. The process of claim 26, wherein the hydrogen source is exogenous to the coal.

28. The process of claim 21, wherein the hydrogen evolution conditions comprise moderate temperature conditions.

29. The process of claim 21, further comprising transporting the evolved molecular hydrogen from a first location to a second location.

* * * * *

UNITED STATES PATENT AND TRADEMARK OFFICE
CERTIFICATE OF CORRECTION

Page 1 of 1

PATENT NO. : 7,901,661 B2
APPLICATION NO. : 11/613999
DATED : March 8, 2011
INVENTOR(S) : Angela Lueking et al.

It is certified that error appears in the above-identified patent and that said Letters Patent is hereby corrected as shown below:

Column 15, line 67 replace "II" with --III--

Signed and Sealed this
Twentieth Day of September, 2011

David J. Kappos
*Director of the United States Patent and Trademark Office*